(12) United States Patent
Cai

(10) Patent No.: US 10,058,771 B2
(45) Date of Patent: Aug. 28, 2018

(54) GYROSCOPE POINTS ACCUMULATION SYSTEM WITH CONVENIENT OPERATION AND DATA INFORMATION READ/WRITE METHOD FOR SAME

(71) Applicants: Guangdong Alpha Animation & Culture Co., Ltd., Shantou (CN); Guangdong Auldey Animation & Toy Co., Ltd., Guangzhou (CN); Guangzhou Alpha Culture Communications Co., Ltd., Guangzhou (CN)

(72) Inventor: Dongqing Cai, Shantou (CN)

(73) Assignees: Guangdong Alpha Animation & Culture Co., Ltd. (CN); Guangdong Auldey Animation & Toy Co., Ltd. (CN); Guangzhou Alpha Culture Communications Co., Ltd. (CN)

( * ) Notice: Subject to any disclaimer, the term of this patent is extended or adjusted under 35 U.S.C. 154(b) by 293 days.

(21) Appl. No.: 14/763,334

(22) PCT Filed: Nov. 2, 2014

(86) PCT No.: PCT/CN2014/090142
§ 371 (c)(1),
(2) Date: Jul. 24, 2015

(87) PCT Pub. No.: WO2015/074483
PCT Pub. Date: May 28, 2015

(65) Prior Publication Data
US 2015/0360123 A1 Dec. 17, 2015

(30) Foreign Application Priority Data
Nov. 21, 2013 (CN) .......................... 2013 1 0588308

(51) Int. Cl.
| | |
|---|---|
| A63F 9/24 | (2006.01) |
| A63F 13/00 | (2014.01) |
| G06F 17/00 | (2006.01) |
| G06F 19/00 | (2018.01) |
| A63F 9/16 | (2006.01) |
| A63H 1/00 | (2006.01) |
| A63H 29/20 | (2006.01) |
| A63H 30/04 | (2006.01) |
| A63F 13/65 | (2014.01) |
| A63F 13/92 | (2014.01) |
| A63F 3/00 | (2006.01) |
| A63F 13/211 | (2014.01) |

(52) U.S. Cl.
CPC ............ *A63F 9/16* (2013.01); *A63F 3/00643* (2013.01); *A63F 3/00697* (2013.01); *A63F 9/24* (2013.01); *A63F 13/65* (2014.09); *A63F 13/92* (2014.09); *A63H 1/00* (2013.01); *A63H 29/20* (2013.01); *A63H 30/04* (2013.01); *A63F 13/211* (2014.09); *A63F 2003/00662* (2013.01); *A63F 2003/00826* (2013.01); *A63F 2009/241* (2013.01); *A63F 2009/2483* (2013.01)

(58) Field of Classification Search
USPC ........ 463/20, 22, 25, 39, 48; 446/90, 91, 93, 446/94, 456; 340/572
See application file for complete search history.

(56) References Cited

U.S. PATENT DOCUMENTS

| | | | |
|---|---|---|---|
| 9,474,985 B2 * | 10/2016 | Huang ................... | A63H 29/22 |
| 2003/0199222 A1 * | 10/2003 | Matsukawa ............ | A63H 30/04 |
| | | | 446/256 |
| 2005/0142983 A1 | 6/2005 | Matsukawa et al. | |
| 2006/0273909 A1 * | 12/2006 | Heiman ................. | A63H 33/00 |
| | | | 340/572.7 |
| 2009/0253343 A1 * | 10/2009 | Kitamura ................. | A63F 9/16 |
| | | | 446/256 |
| 2010/0113174 A1 | 5/2010 | Ahem | |
| 2012/0077593 A1 | 3/2012 | Sarmenta | |
| 2012/0255999 A1 | 10/2012 | Luciano, Jr. et al. | |

(Continued)

FOREIGN PATENT DOCUMENTS

| | | |
|---|---|---|
| CN | 201223710 Y | 4/2009 |
| CN | 102198332 A | 9/2011 |

(Continued)

OTHER PUBLICATIONS

International Search Report for Application No. PCT/CN2014/090142 dated Jan. 13, 2015.
Extended European Search Report for EP14863246.6 dated Dec. 23, 2016.

*Primary Examiner* — Adetokunbo O Torimiro
(74) *Attorney, Agent, or Firm* — Lerner, David, Littenberg, Krumholz & Mentlik, LLP

(57) ABSTRACT

A spinning top scoring system with easy operation, which is characterized by a toy spinning top, which includes a toy main body that is able to rotate in response to a signal emitted by a supporting signal transmitter. The system also includes an RFID chip, which is used for identifying identity information of the toy spinning top and for storing scoring data. Further included in the system is a cell phone with an NFC function, wherein the cell phone comprises a spinning top scoring software system, which is used for reading and displaying the identity information stored in the RFID chip, writing a new identity information into the RFID chip, as well as for reading and displaying the scoring data stored in the RFID chip and outputting or inputting the scoring data to the RFID chip.

13 Claims, 2 Drawing Sheets

(56) References Cited

U.S. PATENT DOCUMENTS

2013/0252726 A1    9/2013  Roberts
2013/0324004 A1*  12/2013  Schwartz ............... A63H 30/04
                                                                        446/259
2014/0091942 A1*  4/2014  Matloff ................ G06T 11/203
                                                                      340/815.53

FOREIGN PATENT DOCUMENTS

| | | | |
|---|---|---|---|
| CN | 102800178 | A | 11/2012 |
| CN | 103366294 | A | 10/2013 |
| CN | 103599636 | A | 2/2014 |
| EP | 2108415 | A1 | 10/2009 |
| JP | 2003211879 | | 7/2003 |
| JP | 2003230761 | | 8/2003 |
| JP | 2005034394 | A | 2/2005 |
| JP | 2008279165 | A | 11/2008 |
| JP | 2009247706 | A | 10/2009 |
| JP | 2009247707 | | 10/2009 |
| KR | 20-0435775 | Y1 | 2/2007 |
| KR | 20090000715 | A | 1/2009 |
| WO | 2008117959 | A1 | 10/2008 |
| WO | 2013177666 | A1 | 12/2013 |

* cited by examiner

GYROSCOPE POINTS ACCUMULATION SYSTEM WITH CONVENIENT OPERATION AND DATA INFORMATION READ/WRITE METHOD FOR SAME

TECHNICAL FIELD

The present invention relates to a spinning top scoring system. More specifically, it is a spinning top scoring system with easy operation and a method of reading and writing data information of the same.

BACKGROUND ART

Spinning top is a toy that many children love to play with. However, the ever progressing technology leads to many changes and variations of the traditional toy spinning top, for example, the spinning top fighting game, in which by way of making a player's spinning top collide with the spinning tops of other players, said player is able to influence the rotating time of another player's spinning top, so as to make the spinning top of another player stop rotating before his or hers. In the case that there are just a few players from the same region, it would be fairly easy to know which players have better techniques. However, in the case that the players are from different regions and that there is no record of previous scores, it would be difficult to know how well the players can play spinning top. In addition, when game participants are from different regions, the game organizer may have difficulty properly selecting participants, as the organizer has no way of knowing the levels of individual players. As a result, some players who have good playing techniques may not be selected to play the game, and thus the intensity of competition among different players could be compromised. Furthermore, before a game, each player needs to be identified by personnel, and during the game, scores need to be recorded in a traditional way; further, many very young players are busy with school, it might be hard to find a common time to gather the children players to play in the same game. Accordingly all of the issues mentioned above may affect a spinning top game. Moreover, the current spinning top scoring system and the method of reading and writing data information are implemented through PC (personal computer) terminals, which are able to overcome the problems mentioned above, yet the required PC operation may be labor consuming or even cumbersome. In addition, in the case that a spinning top game for children players is held outdoors, it can be hard to read and write the scores.

SUMMARY OF INVENTION

To address the above mentioned problems in the existing technology, one object of the present invention is to provide a spinning top scoring system and a method of reading and writing data information thereof, which have the advantages including more convenient operation of data information reading and writing, more diversified game play, allowing easy determination of various children players' game playing techniques, and being helpful to develop children players' sense of competition.

In order to achieve the object mentioned above, the present invention adopts the technical solution as follows: a spinning top scoring system with convenient operation, which is characterized by comprising: a toy spinning top, which is a toy main body that is able to rotate in response to a signal emitted by a supporting signal transmitter; an RFID chip, which is used for identifying an identity information of the toy spinning top and for storing scoring data; and a cell phone with an NFC function, wherein the cell phone comprises a spinning top scoring software system, which is used for reading and displaying the identity information stored in the RFID chip, writing a new identity information into the RFID chip, as well as reading and displaying the scoring data stored in the RFID chip and outputting or inputting the scoring data to the RFID chip.

Wherein, the spinning top scoring software system of the cell phone comprises an activation system, a query system, a modification system and an uploading system, and wherein operations of activation, query, modification and uploading to the toy spinning top are implemented through placing an NFC sensing region of the cell phone close to the RFID chip of the toy spinning top.

In order to allow a convenient replacement of the toy spinning top and at the same time transfer its data information to a new toy spinning top, a round cap for installation of the RFID chip is provided in a central upper portion of the toy spinning top, and a corresponding accommodation chamber is also provided in the toy spinning top, wherein the round cap is disposed in the accommodation chamber, so as to allow the RFID chip to be installed in the toy spinning top in such a way that the RFID chip can be easily uninstalled from the toy spinning top.

In order to further increase the number of ways in which the game can be played, so as to diversify the ways of playing a spinning top, the present invention also comprises a function card for supporting game play. The function card is provided with a RFID chip therein, and the data information of adding points, adding medals and adding footmark is recorded in the RFID chip.

In order to make the game become more interesting and ensure a fair play, the present invention also comprises a battle plate for two toy spinning tops to rotate and compete against each other. The battle plate comprises a plate body and an operator that is located at one end of the plate body. The operator comprises a main control module, a reading and writing module, a displaying module and an information storage and comparison module, which are controlled by the main control module, wherein the reading and writing module is used for communicating with the RFID chip in the toy spinning top, the displaying module comprises a display screen, an indication light and buttons, wherein the displaying module is used for displaying the scoring data stored in the RFID chip, and the buttons are used for outputting or inputting the scoring data stored in the RFID chip, the information storage and comparison module is connected to the main control module via a specific interface, and through the information storage and comparison module, internal information is outputted to the outside or external information is inputted and stored therein.

In order to achieve the aim of allowing a single player to play the game, and that through single player practice a player can improve his or her toy spinning top score to ensure that he or she has sufficient points to join a game to play with other players, as well as for further improve the interest of the game, the present invention also comprises a training plate for a single toy spinning top to practice. The training plate comprises a round plate body and a main controller that is located outside the round plate, an impact post with impact sensor is provided in the center of the round plate, the impact sensor communicates with the main controller and is able to transmit the information of the number that the impact post is impacted by the toy spinning top during its rotation to the main controller, and the main controller comprises a reader and whiter that communicates with the RFID chip, a display screen that is used for displaying time and score, a sensing information receiving and processing module that is used for receiving and then processing the sensing information transmitted from the impact sensor, and operation buttons.

The method of reading and writing data information of the spinning top scoring system according to the present invention, which comprises the method for reading and writing the identity information of the toy spinning top and the cell phone, and the method for reading and writing the scoring data, comprises the steps set forth below:

a. inserting an RFID chip into the toy spinning top and then securing it in the toy spinning top;

b. opening a spinning top scoring software installed in a cell phone, entering a main interface, wherein the main interface comprises five icons, including "activation", "query", "management", "play" and "help";

c. clicking the icon of "activation" to enter a sub-interface of activation, filling or modifying the identity information shown in the sub-interface of activation with a key board of the cell phone, and after completion of the filling or modifying process, clicking the icon of "activation" shown in a dialog box to enter an alerting state of "alert of sensing the toy spinning top";

d. placing an NFC sensing region of the cell phone close to the toy spinning top that is installed with RFID chip, in the case that it is sensed that the toy spinning top has already been activated or cannot be activated, making an alert of corresponding information and suggesting to select another toy spinning top, and in the case that it is sensed that the toy spinning top has not been activated, entering an active state and displaying a corresponding alert, in addition, following a successful activation, displaying an identity information;

e. clicking the icon of "query" to enter a sub-interface of query, placing the NFC sensing region of the cell phone close to the toy spinning top that is installed with RFID chip, reading identity information and score information of the toy spinning top;

f. following a confirmation about the information of the toy spinning tops of two sides, the two sides playing a competition game of toy spinning top, and then determining a result of the competition game;

g. clicking the icon of "play" to enter a sub-interface of play, placing the NFC sensing region of the cell phone close to the toy spinning top of the player who lost the game, conducting a points deduction operation to remove corresponding points from the toy spinning top of the player who lost the game, and then saving it temporally in the cell phone;

h. placing the toy spinning top of the player who won the game close to the NFC sensing region of the cell phone, and then transferring the points that have been deducted from the player who lost the game and saved temporally in the cell phone to the toy spinning top of the player who won the game;

i. clicking the icon of "management" to enter a sub-interface of management, placing a toy spinning top close to the NFC sensing region of the cell phone, following a successful sensing, the foregoing toy spinning top can be performed with the operations including network ranking, network scoring and formatting the toy spinning top's information, as well as the operations including visiting its official website, updating software and obtaining version information.

The present invention further comprises a method for reading and writing data of a toy spinning top and a function card, which comprises the steps set forth below:

a. opening a spinning top scoring software of a cell phone, entering a main interface, and then clicking the icon of "play" to enter a sub-interface of play;

b. placing the function card close to the NFC sensing region of the cell phone, the cell phone receiving information of the function card and then performing a corresponding operation, a corresponding information of the function card being temporality saved in the cell phone;

c. after completion of the corresponding operation of the function card, the interface showing an alert of "prepare to write into spinning top", then placing the toy spinning top close to the NFC sensing region of the cell phone, after a successful sensing, the corresponding information of the function card being written into the spinning top;

d. in the case that the corresponding information in the toy spinning top is not full, then the writing operation being successfully implemented; in the case that that the corresponding information in the toy spinning top is full, popping up an alert window.

The present invention has cleverly adopted a structure that integrally combines a toy spinning top with RFID chip and a cell phone with NFC function. It is different from the currently available spinning top scoring system in that it has integrated the corresponding functions of computer, activator and query machine into an NFC cell phone to convert the computer software used in the currently available spinning top scoring system into cell phone software. By way of the cell phone's NFC function, it can read the information stored in the RFID chip of the spinning top, and then by way of the spinning top scoring software system of the cell phone, it can perform various operations such as activation, query, modification, uploading and the like. As a result, it becomes more convenient to play spinning top game, and the ways to play the spinning top game become more diversified. In addition, since data or information can be uploaded at any time, it becomes more convenient for players to communicate or exchange information. As for a small scale game, it can be effectively carried out without being held at a specific game place. Accordingly, the present invention is able to save more time for those children players. In addition, it is full of fun and entertainment. Moreover, due to the newly added function card and that such a function card is also provided with an RFID chip, wherein the information of adding points, adding medals and adding footmark can be recorded in the RFID chip, when the toy spinning top of a children player receives an award, the corresponding information of honor, medal, trophy or title can be easily recorded in the function card. Alternatively, when a child travels to a new place, the child may be able to register to record his or her footmark through a local function card. In this way, the ways to play the toy spinning top game has been diversified. Accordingly, it can attract more children to play the game that would become the children's favorite. Further, the spinning top scoring system also comprises a battle plate for holding a competition game between the toy spinning tops of two players, and a training plate for practice with a single toy spinning top. As a result, children players may use the battle plate as a game venue for a competition game; and at the same time, the reading and writing operation of scoring data can be conducted, as well as that the video of the competition game can be shown on the display screen. Therefore, it has relatively high levels of entertainment and competition, which helps to attract more interests from children. In addition, the provided training plate allows a single play to play spinning top. Through practicing on the training plate, a player is able to increase the accumulated score of a toy spinning top, so as to ensure that the player has sufficient score to play in a competition game with other players. The foregoing feature helps to further improve the entrainment and playfulness of a game of spinning top. In light of the foregoing, the present invention has the features such as simple structure, high portability and novel game play. Accordingly, children players are able to hold a competition game in any location and at any time. In addition, the operations of score reading and writing can be easily performed. Thus, the present invention can effectively improve the interest and entrainment of game play, as well as helps to develop children players' sense of competition and to promote their intelligence growth. Therefore, the present invention can be widely applied in a wide variety of different toy products of spinning top.

DESCRIPTION OF EMBODIMENTS

Figure 1:
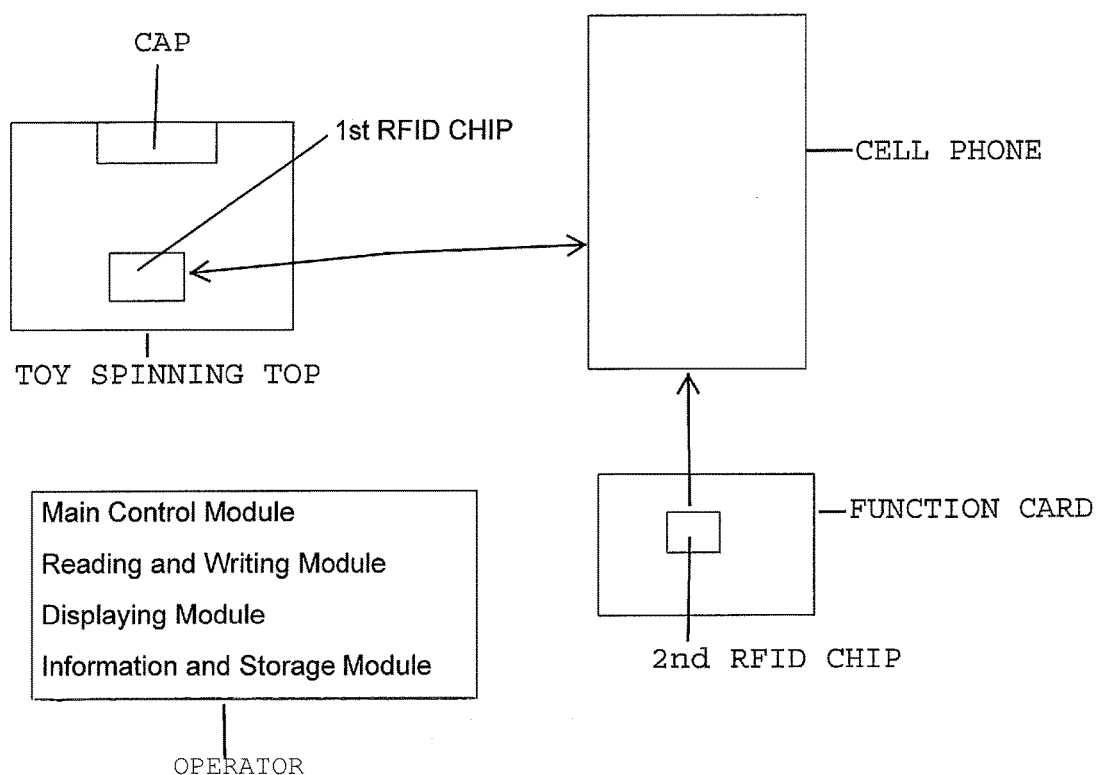
FIG. 1 is a schematic block diagram of the components of the spinning top scoring system.
Figure 2:
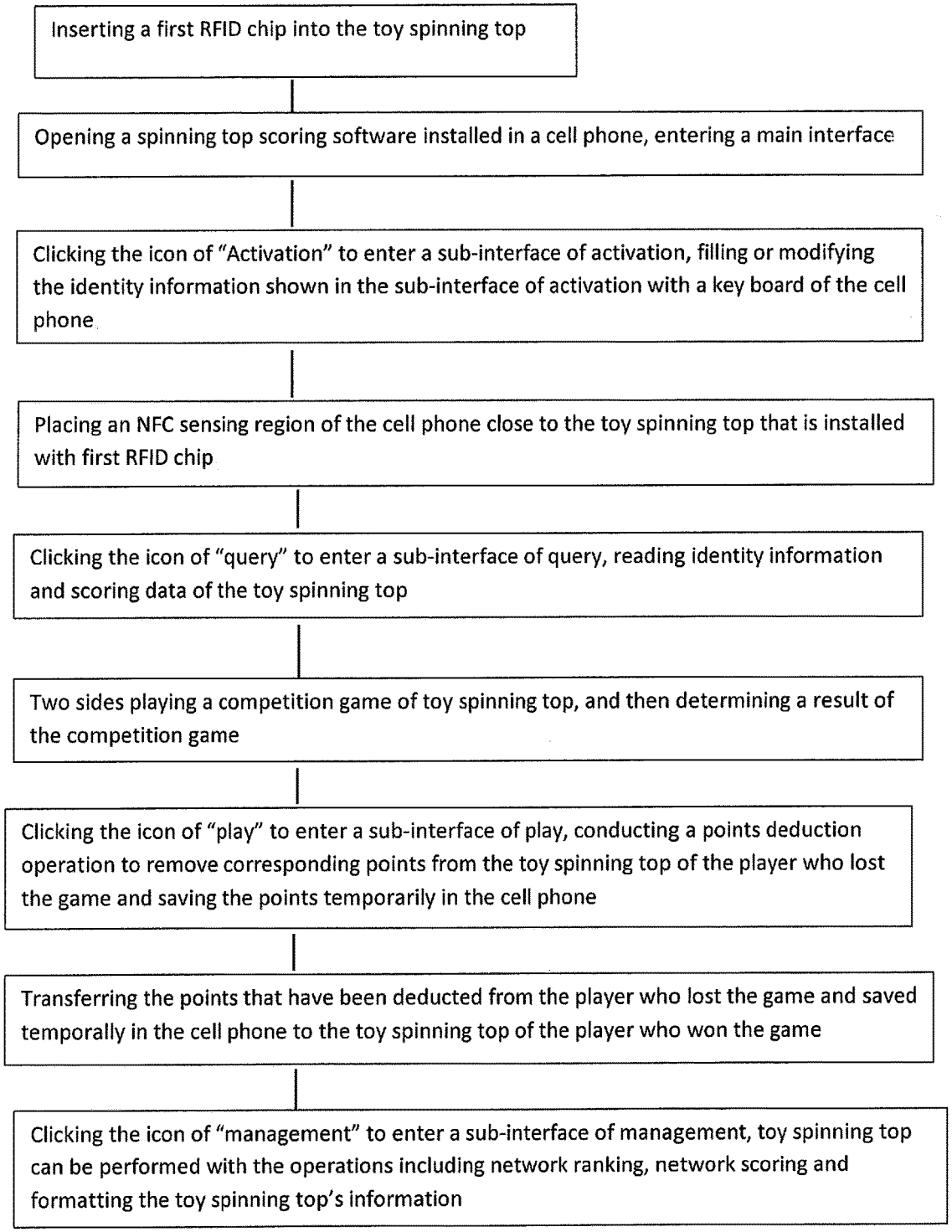
FIG. 2 is as flow chart of a method of reading and writing data information of the spinning top scoring system in accordance with an embodiment.

The spinning top scoring system with easy operation according to the present invention comprises a toy spinning top, which is a toy main body that is able to rotate in response to a signal emitted by a supporting signal transmitter; an RFID chip, which is used for identifying an identity information of the toy spinning top and for storing scoring data; and a cell phone with an NFC function, wherein the cell phone comprises a spinning top scoring software system, which is used for reading and displaying the identity information stored in the RFID chip, writing a new identity information into the RFID chip, as well as reading and displaying the scoring data stored in the RFID chip and outputting or inputting the scoring data to the RFID chip. The present invention has adopted a structure that integrally combines a toy spinning top with RFID chip and a cell phone with NFC function. It is different from the currently available spinning top scoring system in that it has integrated the corresponding functions of computer, activator and query machine into an NFC cell phone to convert the computer software used in the currently available spinning top scoring system into cell phone software. By way of the cell phone's NFC function, it can read the information stored in the RFID chip of the spinning top, and then by way of the spinning top scoring software system of the cell phone, it can perform various operations such as activation, query, modification, uploading and the like. As a result, it becomes more convenient to play spinning top game, and the ways to play the spinning top game become more diversified. In addition, since data or information can be uploaded at any time, it becomes more convenient for players to communicate or exchange information. As for a small scale game, it can be effectively carried out without being held at a specific game place. Accordingly, it is able to save more time for those children players. In addition, it is full of fun and entertainment.

In one embodiment of the present invention, the spinning top scoring software system of a cell phone comprises an activation system, a query system, a modification system and an uploading system, and wherein operations of activation, query, modification and uploading to the toy spinning top are implemented through placing an NFC sensing region of the cell phone close to the RFID chip of the toy spinning top. In this embodiment, a round cap for installation of the RFID chip is provided in a central upper portion of the toy spinning top, and a corresponding accommodation chamber is also provided in the toy spinning top, wherein the round cap is disposed in the accommodation chamber, so as to allow the RFID chip to be installed in the toy spinning top in such a way that the RFID chip can be easily uninstalled from the toy spinning top. The method of reading and writing data information of the spinning top scoring system according to the present invention, which comprises the method for reading and writing the identity information of the toy spinning top and the cell phone, and the method for reading and writing the scoring data, comprises the steps set forth below:

a. inserting an RFID chip into the toy spinning top and then securing it in the toy spinning top;

b. opening a spinning top scoring software installed in a cell phone, entering a main interface, wherein the main interface comprises five icons, including "activation", "query", "management", "play" and "help";

c. clicking the icon of "activation" to enter a sub-interface of activation, filling or modifying the identity information shown in the sub-interface of activation with a key board of the cell phone, which includes name, school, region, and matched spinning top, after completion of the filling or modifying process, clicking the icon of "activation" shown in a dialog box to enter an alerting state of "alert of sensing the toy spinning top";

d. placing an NFC sensing region of the cell phone close to the toy spinning top that is installed with RFID chip, in the case that it is sensed that the toy spinning top has already been activated or cannot be activated, making an alert of corresponding information and suggesting to select another toy spinning top, and in the case that it is sensed that the toy spinning top has not been activated, entering an active state and displaying a corresponding alert, in addition, following a successful activation, displaying an identity information, in addition, a first time activation being awarded 2000 points;

e. clicking the icon of "query" to enter a sub-interface of query, placing the NFC sensing region of the cell phone close to the toy spinning top that is installed with RFID chip, reading identity information and score information of the toy spinning top, which includes spinning top name, basic information, game scores/registration form, honors and footmarks;

f. following a confirmation about the information of the toy spinning tops of two sides, the two sides playing a competition game of toy spinning top, and then determining a result of the competition game;

g. clicking the icon of "play" to enter a sub-interface of play, placing the NFC sensing region of the cell phone close to the toy spinning top of the player who lost the game, the left interface showing an image of the spinning top of the player who lost the game, and below the image, it showing name of the player and name of the spinning top, and further lower, it showing four options for score exchange, including 100, 500, 1000 and all, below the exchange values, it showing the remaining points of the toy spinning top, selecting an exchange value and then clicking the "confirmation" to perform a points deduction operation to remove corresponding points from the toy spinning top of the player who lost the game and saving it temporally in the cell phone;

h. placing the toy spinning top of the player who won the game close to the NFC sensing region of the cell phone, after a successful sensing, the right interface showing an image of the spinning top of the player who won the game, and below the image, it showing name of the player and name of the spinning top, and further lower, it showing the points to be awarded for the subject game, below this value, it showing total points of the toy spinning top, after the sensing is successful, clicking the "confirmation" to transferring the points that have been deducted from the player who lost the game and saved temporally in the cell phone to the toy spinning top of the player who won the game;

i. clicking the icon of "management" to enter a sub-interface of management, placing a toy spinning top close to the NFC sensing region of the cell phone, following a successful sensing, the foregoing toy spinning top can be performed with the operations including network ranking, network scoring and formatting the toy spinning top's information, as well as the operations including visiting its official website, updating software and obtaining version information.

In this embodiment, the spinning top scoring system further comprises a function card for supporting game play. The function card is provided with a RFID chip therein, and the data information of adding points, adding medals and adding footmark is recorded in the RFID chip. In his embodiment, the method for reading and writing data of a toy spinning top and a function card, which comprises the steps set forth below:

a. opening a spinning top scoring software of a cell phone, entering a main interface, and then clicking the icon of "play" to enter a sub-interface of play, and then selecting "function card operation" to enter a corresponding interface, and at the same time, an alert of "cannot find function card" being shown in the center of the display screen;

b. placing the function card close to the NFC sensing region of the cell phone, the cell phone receiving information of the function card, the left interface showing an image of the function card, below the image, it showing name of the function card, below the name, it showing the score to be added; and then performing a corresponding operation, a corresponding information of the function card being temporality saved in the cell phone;

c. after completion of the operation of the function card, the interface showing an alert of "prepare to write into spinning top", then placing the toy spinning top close to the NFC sensing region of the cell phone, after a successful sensing, an alert of "spinning top found, please do not move" being on the display screen, and at the same time, the corresponding information of the function card being written into the spinning top;

d. in the case that the corresponding information in the toy spinning top is not full, then the writing operation being successfully implemented, and an alert of "writing success" being shown on the display screen; in the case that that the corresponding information in the toy spinning top is full, popping up an alert window of writing failure.

The embodiment also comprises a battle plate for two toy spinning tops to rotate and compete against each other. The battle plate comprises a plate body and an operator that is located at one end of the plate body. The operator comprises a main control module, a reading and writing module, a displaying module and an information storage and comparison module, which are controlled by the main control module, in which the reading and writing module is used for communicating with the RFID chip in the toy spinning top, and the reading and writing module has been arranged on one side of the operation in order to facilitate the placement and storage of the toy spinning top; the displaying module comprises a display screen, an indicator and buttons, wherein the displaying module is used for displaying the scoring data stored in the RFID chip, which comprises displaying a total score of the toy spinning top and displaying the ranking information thereof; the buttons are used for outputting or inputting the scoring data stored in the RFID chip, wherein the buttons comprises three point keys including 10 points, 20 points and 50 points, and a confirmation key; the indicator mentioned above comprises two indication lights, which are a red indication light and a green indication light, wherein each indication light represents a game player; the information storage and comparison module is connected to the main control module via a specific interface, and through the information storage and comparison module, internal information is outputted to the outside or external information is inputted and stored therein, wherein the information storage and comparison module has the functions of playing video, viewing image, reading text and processing table, in which the functions of downloading or uploading of video, image, text or table are achieved through its connection to a PC terminal and the function of displaying video is achieved through its connection to a display terminal, and wherein the display terminal is able to alternate displaying advertisement video, game video, image, text and ranking chart. In addition, the method for reading and writing data information of the embodiment further comprises the method for reading and writing the scoring data of the toy spinning top and the battle plate, which comprises the steps set forth below:

a. starting powder of the battle plate to make the battle plate in a standby mode, and a red indication light starting to flash;

b. placing a toy spinning top to the location of the reading and writing module of the battle plate, reading the scoring data thereof, the total score and ranking information of the toy spinning top being displayed on a display screen, at the same time, the red indication light staying on;

c. selecting a game score of 10 points, 20 points or 50 points through a corresponding button, at the same time, the total score of the toy spinning top being deducted of a corresponding score, in addition, the game score may be re-selected for multiple times, after a desired game score being selected, pressing the key of "confirmation";

d. removing the toy spinning top, the red indication light turning off, waiting the toy spinning top of the other participating player to communicate with the battle plate, at this moment, the green indication light starting to flash;

e. placing the toy spinning top of the other participating player to the same location, reading out its total score and ranking information, and now the green indication light staying on;

f. selecting a game score through a corresponding button, at the same time, the total score of the toy spinning top being deducted of a corresponding score, after a desired game score being selected, pressing the key of "confirmation";

g. removing the toy spinning top, the location of the display screen, which is used to display total score, starting to display a countdown;

h. the players of two sides launching their toy spinning tops to the battle plate, the toy spinning tops confronting and colliding against each other, and eventually, a winner being determined;

i. placing the toy spinning top of the winner to the location of the reading and writing module, pressing and holding the key of "confirmation" to write the game scores of the two sides into the toy spinning top of the winner.

In addition, the above mentioned embodiment also comprises a training plate for a single toy spinning top to practice. The training plate comprises a round plate body and a main controller that is located outside the round plate, an impact post with impact sensor is provided in the center of the round plate, the impact sensor communicates with the main controller and is able to transmit the information of the number of the impact post being impacted by the toy spinning top during rotation of the toy spinning top to the main controller, and the main controller comprises a reader and whiter that communicates with an IC chip, a display screen that is used for displaying time and score, wherein the display screen is an LED digital display screen that is able to display two digits, three scoring display lights that will be turned on when the impact post is impacted by a toy spinning top, in which the three display lights have been marked with 10 points, points and 30 points therebelow, respectively; a sensing information receiving and processing module that is used for receiving and then processing the sensing information transmitted from the impact sensor, and operation buttons, wherein the operation buttons comprise a "start" button and a "reset" button. Similarly, the training plate is also provided with a speaker used for promoting an operation. In this embodiment, the round plate body of the training plate may be designed into a rotatable plate body. In such a case, when a toy spinning top is launched onto the round plate body, the round plate body will be triggered to rotate. In this embodiment, the method for reading and writing data information further comprises the method for reading and writing the scoring data of the toy spinning top and the training plate, which comprises the steps set forth below:

a. starting powder of the training plate to make the training plate in a standby mode, and the display screen being in a rolling display state;

b. placing a toy spinning top to the location of the reading and writing module of the training plate, reading the identity information and scoring data of the toy spinning top d. removing the toy spinning top, and then pressing the "start" button of the training plate, the display screen displaying a countdown;

e. launching the toy spinning top onto the round plate body, starting to time, during its rotating course, the toy spinning top impacting the impact post of the round plate body;

f. based on impact strength, a corresponding score being displayed on the display screen by the system, in the case that the time is reset to zero or the toy spinning top spinning tops rotating, the display screen displaying a total score received;

g. placing the toy spinning top to the location of the reader and writer, writing the score received in the training into the toy spinning top.

Although the present invention has been described in reference to the specific embodiment, the description of the embodiment is not to limit the present invention. In reference to the disclosures of the present invention, a person of ordinary skill in the art is able to achieve other modifications or alternations of the embodiments of the present invention. Those modifications or alternations should within the scope of the present invention as defined by the claims.

What is claimed is:

1. A spinning top scoring system with easy operation comprising a toy spinning top and a cell phone, which is characterized by comprising:

the toy spinning top, which includes a toy main body that is adapted to rotate in response to a signal emitted by a supporting signal transmitter;

a first RFID chip in the toy spinning top, which is used for identifying an identity information of the toy spinning top and for storing scoring data;

the cell phone having an NFC function, wherein the cell phone includes spinning top scoring software, which cell phone performs the operations of reading and displaying the identity information stored in the first RFID chip, writing a new identity information into the first RFID chip, as well as for reading and displaying the scoring data stored in the first RFID chip and outputting or inputting the scoring data to the first RFID chip; and a function card for supporting game play;

wherein the function card is provided with a second RFID chip for storing information, wherein the cell phone performs the operation of reading the information stored in the second RFID chip of the function card, temporarily saving the information read from the second RFID chip, and writing information into the first RFID chip of the toy spinning top which was temporarily saved from the second RFID chip of the function card.

2. The spinning top scoring system with easy operation as claimed in claim 1, characterized in that the spinning top scoring software of the cell phone comprises an activation system, a query system, a modification system and an uploading system, wherein operations of activation, query, modification and uploading to the toy spinning top are implemented through placing an NFC sensing region of the cell phone close to the first RFID chip of the toy spinning top.

3. A method of reading and writing data information of the spinning top scoring system claimed in claim 2, characterized in that it comprises a method for reading and writing the identity information of the toy spinning top and the cell phone, and a method for reading and writing the scoring data, comprising the steps set forth below:

a. inserting an RFID chip into the toy spinning top and then securing it in the toy spinning top;

b. opening a spinning top scoring software installed in a cell phone, entering a main interface, wherein the main interface comprises five icons, including "activation", "query", "management", "play" and "help";

c. clicking the icon of "activation" to enter a sub-interface of activation, filling or modifying the identity information shown in the sub-interface of activation with a key board of the cell phone, and after completion of the filling or modifying process, clicking the icon of "activation" shown in a dialog box to enter an alerting state of "alert of sensing the toy spinning top";

d. placing an NFC sensing region of the cell phone close to the toy spinning top that is installed with RFID chip, in the case that it is sensed that the toy spinning top has already been activated or cannot be activated, making an alert of corresponding information and suggesting to select another toy spinning top, and in the case that it is sensed that the toy spinning top has not been activated, entering an active state and displaying a corresponding alert, following a successful activation, displaying an identity information;

e. clicking the icon of "query" to enter a sub-interface of query, placing the NFC sensing region of the cell phone close to the toy spinning top that is installed with RFID chip, reading identity information and score information of the toy spinning top;

f. following a confirmation about the information of the toy spinning tops of two sides, the two sides playing a competition game of toy spinning top, and then determining a result of the competition game;

g. clicking the icon of "play" to enter a sub-interface of play, placing the NFC sensing region of the cell phone close to the toy spinning top of the player who lost the game, conducting a points deduction operation to remove corresponding points from the toy spinning top of the player who lost the game and saving the points temporally in the cell phone;

h. placing the toy spinning top of the player who won the game close to the NFC sensing region of the cell phone, and then transferring the points that have been deducted from the player who lost the game and saved temporally in the cell phone to the toy spinning top of the player who won the game;

i. clicking the icon of "management" to enter a sub-interface of management, placing a toy spinning top close to the NFC sensing region of the cell phone, following a successful sensing, the foregoing toy spinning top can be performed with the operations including network ranking, network scoring and formatting the toy spinning top's information, as well as the operations including visiting its official website, updating software and obtaining version information.

4. The spinning top scoring system with easy operation as claimed in claim 1, characterized in that a round cap for installation of the first RFID chip is provided in a central upper portion of the toy spinning top, and a corresponding accommodation chamber is also provided in the toy spinning top, wherein the round cap is disposed in the accommodation chamber, so as to allow the first RFID chip to be installed in the toy spinning top in such a way that the first RFID chip can be easily uninstalled from the toy spinning top.

5. A method of reading and writing data information of the spinning top scoring system claimed in claim 4, characterized in that it comprises a method for reading and writing the identity information of the toy spinning top and the cell phone, and a method for reading and writing the scoring data, comprising the steps set forth below:

a. inserting an RFID chip into the toy spinning top and then securing it in the toy spinning top;

b. opening a spinning top scoring software installed in a cell phone, entering a main interface, wherein the main interface comprises five icons, including "activation", "query", "management", "play" and "help";

c. clicking the icon of "activation" to enter a sub-interface of activation, filling or modifying the identity information shown in the sub-interface of activation with a key board of the cell phone, and after completion of the filling or modifying process, clicking the icon of "activation" shown in a dialog box to enter an alerting state of "alert of sensing the toy spinning top";

d. placing an NFC sensing region of the cell phone close to the toy spinning top that is installed with RFID chip, in the case that it is sensed that the toy spinning top has already been activated or cannot be activated, making an alert of corresponding information and suggesting to select another toy spinning top, and in the case that it is sensed that the toy spinning top has not been activated, entering an active state and displaying a corresponding alert, following a successful activation, displaying an identity information;

e. clicking the icon of "query" to enter a sub-interface of query, placing the NFC sensing region of the cell phone close to the toy spinning top that is installed with RFID chip, reading identity information and score information of the toy spinning top;

f. following a confirmation about the information of the toy spinning tops of two sides, the two sides playing a competition game of toy spinning top, and then determining a result of the competition game;

g. clicking the icon of "play" to enter a sub-interface of play, placing the NFC sensing region of the cell phone close to the toy spinning top of the player who lost the game, conducting a points deduction operation to remove corresponding points from the toy spinning top of the player who lost the game and saving the points temporally in the cell phone;

h. placing the toy spinning top of the player who won the game close to the NFC sensing region of the cell phone, and then transferring the points that have been deducted from the player who lost the game and saved temporally in the cell phone to the toy spinning top of the player who won the game;

i. clicking the icon of "management" to enter a sub-interface of management, placing a toy spinning top close to the NFC sensing region of the cell phone, following a successful sensing, the foregoing toy spinning top can be performed with the operations including network ranking, network scoring and formatting the toy spinning top's information, as well as the operations including visiting its official website, updating software and obtaining version information.

6. The spinning top scoring system with easy operation as claimed in claim 1, characterized in that it further comprises a battle plate for two toy spinning tops to rotate and compete against each other, the battle plate comprises a plate body and an operator that is located at one end of the plate body, the operator comprises a main control module, a reading and writing module, a displaying module and an information storage and comparison module, which are controlled by the main control module, wherein the reading and writing module is used for communicating with the first RFID chip in the toy spinning top, the displaying module comprises a display screen, an indication light and buttons, wherein the displaying module is used for displaying the scoring data stored in the first RFID chip, and the buttons are used for outputting or inputting the scoring data stored in the first RFID chip, the information storage and comparison module is connected to the main control module via a specific interface, and through the information storage and comparison module, internal information is outputted to the outside or external information is inputted and stored therein.

7. A method of reading and writing data information of the spinning top scoring system claimed in claim 6, characterized in that it further comprises a method for reading and writing scoring data of the toy spinning top and the battle plate, comprising the steps set forth below:

a. starting power of the battle plate to make the battle plate in a standby mode, and a red indication light starting to flash;

b. placing a toy spinning top to the location of the reading and writing module of the battle plate, reading the scoring data thereof, and the red indication light staying on;

c. selecting a game score through a corresponding button, at the same time, the total score of the toy spinning top being deducted of a corresponding score, after a desired game score being selected, pressing the key of "confirmation";

d. removing the toy spinning top, the red indication light turning off, waiting the toy spinning top of the other participating player to communicate with the battle plate, at this moment, the green indication light starting to flash;

e. placing the toy spinning top of the other participating player to the same location, reading its scoring data, and the green indication light staying on;

f. selecting a game score through a corresponding button, at the same time, the total score of the toy spinning top being deducted of a corresponding score, after a desired game score being selected, pressing the key of "confirmation";

g. removing the toy spinning top, the display screen displaying a countdown;

h. the players of two sides launching their toy spinning tops to the battle plate, the toy spinning tops confronting and colliding against each other, and eventually, a winner being determined;

i. placing the toy spinning top of the winner to the location of the reading and writing module, pressing and holding the key of "confirmation" to write the game scores of the two sides into the toy spinning top of the winner.

8. The spinning top scoring system with easy operation as claimed in claim 1, characterized in that it further comprises a training plate for a single toy spinning top to practice, the training plate comprises a round plate body and a main controller that is located outside the round plate body, an impact post with impact sensor is provided in the center of the round plate body, the impact sensor communicates with the main controller and is able to transmit the information of the number of the impact post being impacted by the toy spinning top during rotation of the toy spinning top to the main controller, and the main controller comprises a reader and whiter that communicates with the first RFID chip, a display screen that is used for displaying time and score, a sensing information receiving and processing module that is used for receiving and then processing the sensing information transmitted from the impact sensor, and operation buttons.

9. A method of reading and writing data information of the spinning top scoring system claimed in claim 8, characterized in that it further comprises a method for reading and writing scoring data of the toy spinning top and the training plate, comprising the steps set forth below:

a. starting power of the training plate to make the training plate in a standby mode, and the display screen being in a display state;

b. placing a toy spinning top to the location of the reading and writing module of the training plate, reading the identity information and scoring data of the toy spinning top;

c. removing the toy spinning top, and then pressing the "start" button of the training plate, the display screen displaying a countdown;

d. launching the toy spinning top onto the round plate body, starting to time, during its rotating course, the toy spinning top impacting the impact post of the round plate body, and starting to time;

e. based on impact strength, a corresponding score being displayed on the display screen by the system, in the case that the time is reset to zero or the toy spinning top stops rotating, the display screen displaying a total score received;

f. placing the toy spinning top to the location of reader and writer, writing the score received in the training into the toy spinning top.

10. A method of reading and writing data information of the spinning top scoring system claimed in claim 1, characterized in that it comprises a method for reading and writing the identity information of the toy spinning top and the cell phone, and a method for reading and writing the scoring data, comprising the steps set forth below:

a. inserting a first RFID chip into the toy spinning top and then securing it in the toy spinning top;

b. opening a spinning top scoring software installed in a cell phone, entering a main interface, wherein the main interface comprises five icons, including "activation", "query", "management", "play" and "help";

c. clicking the icon of "activation" to enter a sub-interface of activation, filling or modifying the identity information shown in the sub-interface of activation with a key board of the cell phone, and after completion of the filling or modifying process, clicking the icon of "activation" shown in a dialog box to enter an alerting state of "alert of sensing the toy spinning top";

d. placing an NFC sensing region of the cell phone close to the toy spinning top that is installed with first RFID chip, in the case that it is sensed that the toy spinning top has already been activated or cannot be activated, making an alert of corresponding information and suggesting to select another toy spinning top, and in the case that it is sensed that the toy spinning top has not been activated, activating the toy spinning top by the cell phone and displaying a corresponding alert, following a successful activation, displaying an identity information;

e. clicking the icon of "query" to enter a sub-interface of query, placing the NFC sensing region of the cell phone close to the toy spinning top that is installed with first RFID chip, reading identity information and scoring data of the toy spinning top;

f. following a confirmation about the information of the toy spinning tops of two sides, the two sides playing a competition game of toy spinning top, and then determining a result of the competition game;

g. clicking the icon of "play" to enter a sub-interface of play, placing the NFC sensing region of the cell phone close to the toy spinning top of the player who lost the game, conducting a points deduction operation to remove corresponding points from the toy spinning top of the player who lost the game and saving the points temporally in the cell phone;

h. placing the toy spinning top of the player who won the game close to the NFC sensing region of the cell phone, and then transferring the points that have been deducted from the player who lost the game and saved temporally in the cell phone to the toy spinning top of the player who won the game;

i. clicking the icon of "management" to enter a sub-interface of management, placing a toy spinning top close to the NFC sensing region of the cell phone, following a successful sensing, the foregoing toy spinning top can be performed with the operations including network ranking, network scoring and formatting the toy spinning top's information, as well as the operations including visiting its official website, updating software and obtaining version information.

11. A method of reading and writing data information of the spinning top scoring system claimed in claim 1, characterized in that it further comprises a method for reading and writing data of a toy spinning top and the function card, comprising the steps set forth below:

a. opening a spinning top scoring software of a cell phone, entering a main interface, and then clicking the icon of "play" to enter a sub-interface of play;

b. placing the function card close to the NFC sensing region of the cell phone, the cell phone receiving information of the function card and then performing a corresponding operation, a corresponding information of the function card being temporality saved in the cell phone;

c. after completion of the operation of the function card, the interface showing an alert of "prepare to write into spinning top", then placing the toy spinning top close to the NFC sensing region of the cell phone, after a successful sensing, the corresponding information on the function card being written into the spinning top;

d. in the case that the corresponding information in the toy spinning top is not full, then the writing operation being successfully implemented; in the case that that the corresponding information in the toy spinning top is full, popping up an alert window.

12. A method of reading and writing data information of a spinning top scoring system comprising a toy spinning top, which includes a toy main body that is adapted to rotate in response to a signal emitted by a supporting signal transmitter; an RFID chip operative for identifying an identity information of the toy spinning top and for storing scoring data; and a cell phone having an NFC function, wherein the cell phone includes spinning top scoring software, operative for reading and displaying the identity information stored in the RFID chip, writing a new identity information into the RFID chip, and for reading and displaying the scoring data stored in the RFID chip and outputting or inputting the scoring data to the RFID chip, characterized in that:

the method comprises a method for reading and writing the identity information of the toy spinning top and the cell phone, and a method for reading and writing the scoring data, comprising the steps set forth below:

a. inserting an RFID chip into the toy spinning top and then securing it in the toy spinning top;

b. opening a spinning top scoring software installed in a cell phone, entering a main interface, wherein the main interface comprises five icons, including "activation", "query", "management", "play" and "help";

c. clicking the icon of "activation" to enter a sub-interface of activation, filling or modifying the identity information shown in the sub-interface of activation with a key board of the cell phone, and after completion of the filling or modifying process, clicking the icon of "activation" shown in a dialog box to enter an alerting state of "alert of sensing the toy spinning top";

d. placing an NFC sensing region of the cell phone close to the toy spinning top that is installed with RFID chip, in the case that it is sensed that the toy spinning top has already been activated or cannot be activated, making an alert of corresponding information and suggesting to select another toy spinning top, and in the case that it is sensed that the toy spinning top has not been activated, activating the toy spinning top by the cell phone and displaying a corresponding alert, following a successful activation, displaying an identity information;

e. clicking the icon of "query" to enter a sub-interface of query, placing the NFC sensing region of the cell phone close to the toy spinning top that is installed with RFID chip, reading identity information and scoring data of the toy spinning top;

f. following a confirmation about the information of the toy spinning tops of two sides, the two sides playing a competition game of toy spinning top, and then determining a result of the competition game;

g. clicking the icon of "play" to enter a sub-interface of play, placing the NFC sensing region of the cell phone close to the toy spinning top of the player who lost the game, conducting a points deduction operation to remove corresponding points from the toy spinning top of the player who lost the game and saving the points temporally in the cell phone;

h. placing the toy spinning top of the player who won the game close to the NFC sensing region of the cell phone, and then transferring the points that have been deducted from the player who lost the game and saved temporally in the cell phone to the toy spinning top of the player who won the game;

i. clicking the icon of "management" to enter a sub-interface of management, placing a toy spinning top close to the NFC sensing region of the cell phone, following a successful sensing, the foregoing toy spinning top can be performed with the operations including network ranking, network scoring and formatting the toy spinning top's information, as well as the operations including visiting its official website, updating software and obtaining version information.

13. A method of reading and writing data information of a spinning top scoring system comprising a toy spinning top, which includes a toy main body that is adapted to rotate in response to a signal emitted by a supporting signal transmitter; an RFID chip operative for identifying an identity information of the toy spinning top and for storing scoring data; and a cell phone having an NFC function, wherein the cell phone includes spinning top scoring software, operative for reading and displaying the identity information stored in the RFID chip, writing a new identity information into the RFID chip, and for reading and displaying the scoring data stored in the RFID chip and outputting or inputting the scoring data to the RFID chip; and a training plate for a single toy spinning top to practice, the training plate comprises a round plate body and a main controller that is located outside the round plate body, an impact post with impact sensor is provided in the center of the round plate body, the impact sensor communicates with the main controller and is able to transmit the information of the number of the impact post being impacted by the toy spinning top during rotation of the toy spinning top to the main controller, and the main controller comprises a reader and whiter that communicates with the RFID chip, a display screen that is used for displaying time and score, a sensing information receiving and processing module that is used for receiving and then processing the sensing information transmitted from the impact sensor, and operation buttons; characterized in that;

the method comprises a method for reading and writing scoring data of the toy spinning top and the training plate, comprising the steps set forth below:

a. starting power of the training plate to make the training plate in a standby mode, and the display screen being in a display state;

b. placing a toy spinning top to the location of the reading and writing module of the training plate, reading the identity information and scoring data of the toy spinning top;

c. removing the toy spinning top, and then pressing the "start" button of the training plate, the display screen displaying a countdown;

d. launching the toy spinning top onto the round plate body, starting to time, during its rotating course, the toy spinning top impacting the impact post of the round plate body, and starting to time;
e. based on impact strength, a corresponding score being displayed on the display screen by the system, in the case that the time is reset to zero or the toy spinning top stops rotating, the display screen displaying a total score received;
f. placing the toy spinning top to the location of reader and writer, writing the score received in the training into the toy spinning top.

\* \* \* \* \*